(12) United States Patent
Tian

(10) Patent No.: US 10,135,124 B1
(45) Date of Patent: Nov. 20, 2018

(54) ANTENNA ASSEMBLY

(71) Applicant: Pinnacle Vista, LLC, Upland, CA (US)

(72) Inventor: Yu Tian, Hong Kong (HK)

(73) Assignee: Pinnacle Vista, LLC, Upland, CA (US)

( * ) Notice: Subject to any disclaimer, the term of this patent is extended or adjusted under 35 U.S.C. 154(b) by 0 days.

(21) Appl. No.: 15/800,501

(22) Filed: Nov. 1, 2017

Related U.S. Application Data

(60) Provisional application No. 62/522,027, filed on Jun. 19, 2017.

(51) Int. Cl.
| | | |
|---|---|---|
| *H01Q 1/32* | (2006.01) | |
| *H01Q 1/27* | (2006.01) | |
| *H01Q 1/42* | (2006.01) | |
| *H01Q 1/36* | (2006.01) | |

(52) U.S. Cl.
CPC .............. *H01Q 1/27* (2013.01); *H01Q 1/362* (2013.01); *H01Q 1/42* (2013.01)

(58) Field of Classification Search
CPC ............. H01Q 1/27; H01Q 1/362; H01Q 1/42
See application file for complete search history.

(56) References Cited

U.S. PATENT DOCUMENTS

| | | | | |
|---|---|---|---|---|
| H966 H | * | 9/1991 | Waters | .......................... 342/361 |
| 2007/0241244 A1 | * | 10/2007 | Tavassoli Hozouri | ...................... F16M 11/105 248/183.1 |
| 2007/0279304 A1 | * | 12/2007 | Chakam | ................. H01Q 1/088 343/713 |
| 2015/0219759 A1 | * | 8/2015 | Atsumi | ................... G01S 7/003 342/52 |

FOREIGN PATENT DOCUMENTS

GB         2455374 A  *  6/2009   ............ B64C 27/08

* cited by examiner

*Primary Examiner* — Dieu H Duong
(74) *Attorney, Agent, or Firm* — WPAT, P.C., Intellectual Property Attorneys; Anthony King

(57) ABSTRACT

An antenna assembly includes: a base; a first rod coupled to the base; an outer frame coupled to the first rod, the outer frame being rotatable around the first rod; a first antenna having a first end coupled to a first position of an inner surface of the curvy frame, and a second end coupled to a second position of the inner surface of the outer frame, the first antenna being rotatable around a pivot extending from the first position to the second position; and a second antenna having a first end coupled to a third position of the inner surface of the outer frame, and a second end exposed to an inner space surrounded by the outer frame.

16 Claims, 7 Drawing Sheets

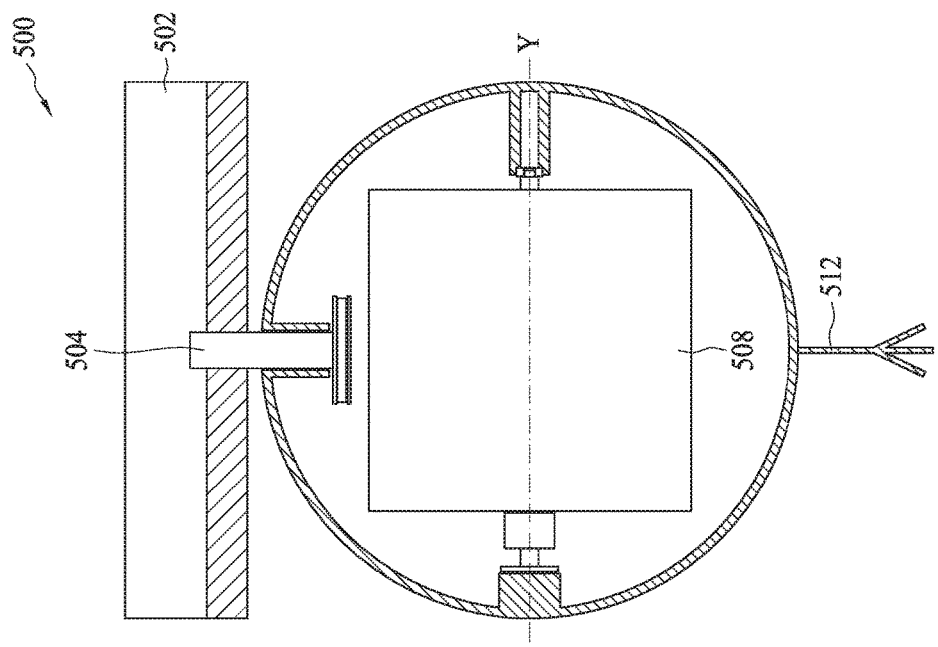
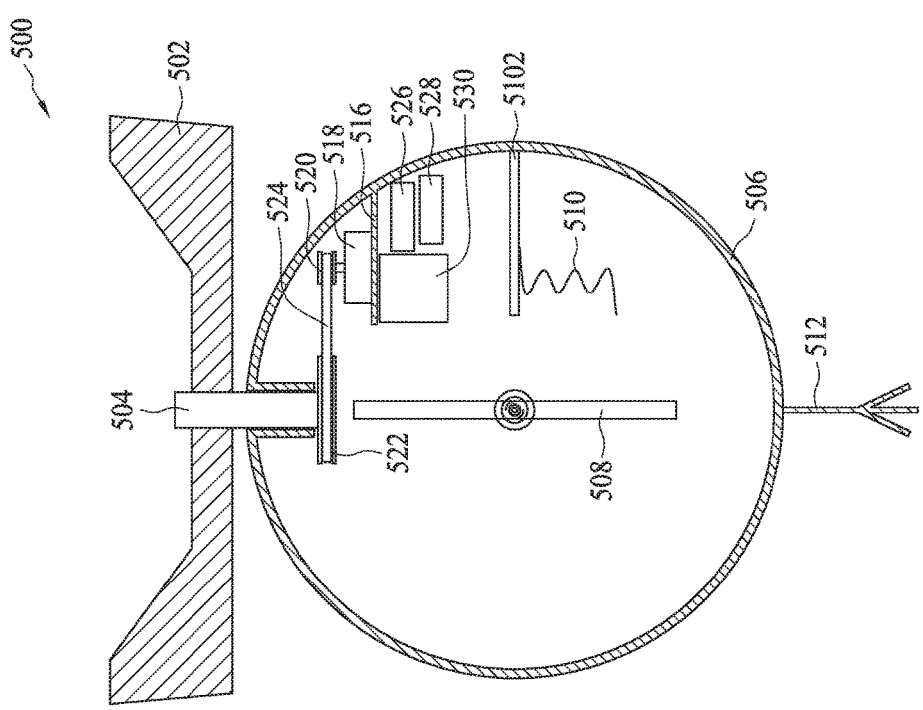
FIG. 5A
FIG. 5B

118

ANTENNA ASSEMBLY

CROSS-REFERENCE TO RELATED APPLICATION

This application claims the benefit of U.S. Provisional Application No. 62/522,027 filed Jun. 19, 2017, which is hereby incorporated by reference in its entirety.

This application also contains subject matter similar to that disclosed in the concurrently field U.S. Non-Provisional Patent Application entitled "Antenna Assembly System" (by the same applicant and the same inventor), which is hereby expressly incorporated by reference as part of the present disclosure.

BACKGROUND

Unmanned aerial vehicles (UAVs) are remotely piloted or autonomous aircraft that can carry cameras, sensors, communications equipment, or other payloads. Stability of data transmission as well as the required data rate, which continuously increases, between a UAV controller and an UAV or among the UAVs is one of the key factors to evaluate the performance of UAVs. Therefore, there is a need for designing new antennae to satisfy the strict requirement of data transmission to and from UAV.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 5A is a diagram illustrating an antenna assembly according to some embodiments of the present invention.

FIG. 5B is a diagram illustrating a front view of the antenna assembly of FIG. 5A according to some embodiments of the present invention.

SUMMARY OF THE DISCLOSURE

Figure 1:
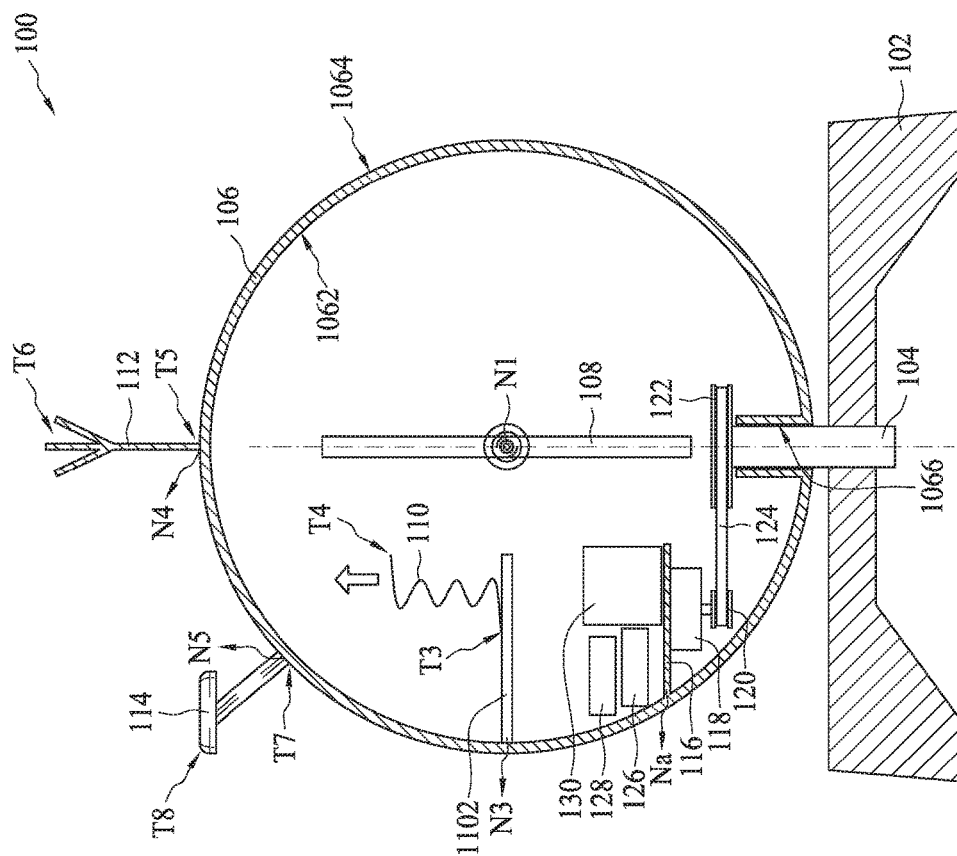
FIG. 1 is a diagram illustrating an antenna assembly according to some embodiments of the present invention.

Embodiments of an antenna assembly is discloses herein. The antenna assembly is contemplated to have a rod, an outer frame (e.g., a casing) rotatably coupled to the rod and wherein the outer frame being rotatable relative to the rod. The outer frame is rotatable about a vertical axis of the outer frame.

In one embodiment, a flat panel antenna is provided that is capable of moving in a pivoting motion about a horizontal axis. The flat panel antenna can have a first end coupled to a first position of an inner surface of the outer frame.

Further contemplated is where the first panel antenna can be pivotable around a pivot extending from the first position to move in a pivoting motion.

In yet another embodiment, a helical antenna can be disposed within the outer frame and is directed in a direction parallel to the vertical axis.

Also contemplated is that the flat panel antenna be arranged to tilt an angle between −90 degrees to +90 degrees around the pivot.

The antenna assembly can further include a measurement unit disposed on a middle portion of the flat panel antenna to measure an angle of the flat panel antenna.

The antenna assembly can also include a motor to rotate the outer frame around the first rod.

The contemplated antenna assembly can further include a control panel disposed within the outer frame and a power supply disposed within the outer frame to supply power to the motor.

Any disclosed embodiments of the antenna assembly can be installed or used on a vehicle, wherein the vehicle can be an aerial vehicle, a land vehicle, or a watercraft.

Within the outer frame of the antenna assembly is contemplated other antennae or receivers, such as a second panel antenna directed in said direction parallel to said vertical axis and a helical antenna disposed behind the flat panel antenna.

There can be an omni-directional antenna disposed on an outside of said outer frame on an opposite end of the outer frame to the rod, wherein the omni-directional antenna can be disposed on the same vertical axis as said rod.

There can also be a GPS antenna disposed on said outside of the outer frame, wherein the GPS antenna is arranged to receive a Global Positioning System (GPS) signal. In some embodiments, GPS antenna is not needed because the vehicle to which the antenna assembly is installed on can provide such information.

Any moving parts within the antenna assembly can be driven by any one of a belt-driven type, a brushless motor, and a servo motor.

DETAILED DESCRIPTION

The various embodiments can now be better understood by turning to the following description. These embodiments are presented as illustrated examples.

Many alterations and modifications may be made by those having ordinary skill in the art without departing from the spirit and scope of the embodiments. Therefore, it must be understood that the illustrated embodiments have been set forth only for the purposes of example and that they should not be taken as limiting.

The words used in this specification to describe the embodiments are to be understood not only in the sense of their commonly defined meanings, but to include by special definition in this specification structure, material or acts beyond the scope of the commonly defined meanings.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements disclosed or that a single element may be substituted for two or more elements. Although elements may be described herein as acting in certain combinations, it is to be expressly understood that one or more elements from a disclosed combination can in some cases be excised from the combination and that the combination may be directed to a sub-combination or variation of a sub-combination.

The inventor has discovered new ways to improve the integrity, effectiveness, and production cost of antennae for data transmission to and from the following communication points: UAV or drone, mobile ground station, land vehicle, watercraft, stationary control center on the ground, control center on top of a building, and handheld device. This disclosure also includes a novel method of antennae placement/arrangement to minimize interference.

The interference covers radio interference and also physical obstruction. Physical obstruction means that when antenna A is physically located in the middle of a line of sight between two other antennae, such as antenna B and antenna C, that are communicating with each other, antenna A is physically obstructing the communication between B and C.

It should be especially noted that although this disclosure specifically discusses using the contemplated antenna design on a UAV or on a land vehicle for data transmission to and from a UAV, the contemplated antenna can be used in any suitable data transmission scenarios, whether with or without a UAV. One or ordinary skill in the art would appreciate that the contemplated embodiments can be used in other data transmission situations.

Further, spatially relative terms, such as "beneath," "below," "lower," "above," "upper", "lower", "left", "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. It will be understood that when an element is referred to as being "connected to" or "coupled to" another element, it may be directly connected to or coupled to the other element, or intervening elements may be present.

FIG. 1 is a diagram illustrating an antenna assembly 100 according to some embodiments of the present invention. The antenna assembly 100 comprises a base 102, a first rod 104, a curvy frame 106, and a plurality of antennae 108, 110, 112, 114. The base 102 is arranged to be installed on a moving object, such as a vehicle or an unmanned aerial vehicle (UAV), for fixing the antenna assembly 100 on the moving object. The base 102 is a support base of the antenna assembly 100. The first rod 104 is coupled to the base 102. The first rod 104 may be fixedly installed on the base 102. The curvy frame 106 is coupled to the first rod 104, and the curvy frame 106 is arranged to be rotatable around the longitudinal axis Z of the first rod 104. A portion of the first rod 104 is disposed inside the curvy frame 106 while another portion of the first rod 104 is disposed outside the curvy frame 106.

For illustrative purpose, the curvy frame 106 is a spherical and transparent casing, and this is not a limitation of the present embodiments. The casing may not be transparent. According to some embodiments, the curvy frame 106 may be designed to have other shapes. For example, the curvy frame 106 may be in a shape that conforms with the overall contour and design of the UAV or land vehicle that the antenna assembly 100 installed on so that the contemplated antenna assembly 100 is less noticeable. In yet further embodiments, the curvy frame 106 may be any other shapes that are deemed aerodynamic.

It is noted that the curvy frame 106 may be used for protecting the elements enclosed therein from damage when crashing. However, the curvy frame 106 may be omitted for reducing the cost or for easing the repairing of the elements.

According to some embodiments, the curvy frame 106 has an inner surface 1062 and an outer surface 1064. Furthermore, the curvy frame 106 is arranged to have a hole 1066, and the first rod 104 is inserted in the hole 1066. It is noted that the first rod 104 is not fixedly attached on the inner surface of the hole 1066. Instead, the first rod 104 is rotatably installed on the inner surface of the hole 1066 such that the curvy frame 106 may rotate around the longitudinal axis Z of the first rod 104.

In order to control the curvy frame 106 to rotate around the first rod 104, the antenna assembly 100 further comprises a rack 116, a motor 118, a second rod 120, a flywheel 122, a belt 124, a control panel 126, a control board 128, and a power supply 130. According to some embodiments, the rack 116 is fixedly coupled to a predetermined position Na of the inner surface 1062. The motor 118 is coupled to a bottom side of the rack 116. The rack 116 is horizontally disposed in the lower portion inside the curvy frame 106.

The motor 118 can be fixedly coupled to the bottom side of the rack 116. The second rod 120 can be a rotatable rod coupled to the motor 118. The motor 118 is arranged to rotate the second rod 120 for driving the belt 124. As shown in FIG. 1, the flywheel 122 is coupled to the first rod 104. For example, the flywheel 122 is fixedly attached on the top of the first rod 104. The belt 124 is mounted on the flywheel 122 and the second rod 120. According to some embodiments, the motor 118 is arranged to rotate the second rod 120 and accordingly turns the belt 124. As the flywheel 122 is fixedly attached on the top of the first rod 104, and the curvy frame 106 is rotatably installed on the first rod 104, the turning of the second rod 120 and the belt 124 may cause the curvy frame 106 to rotate around the longitudinal axis Z of the first rod 104.

Figure 7:
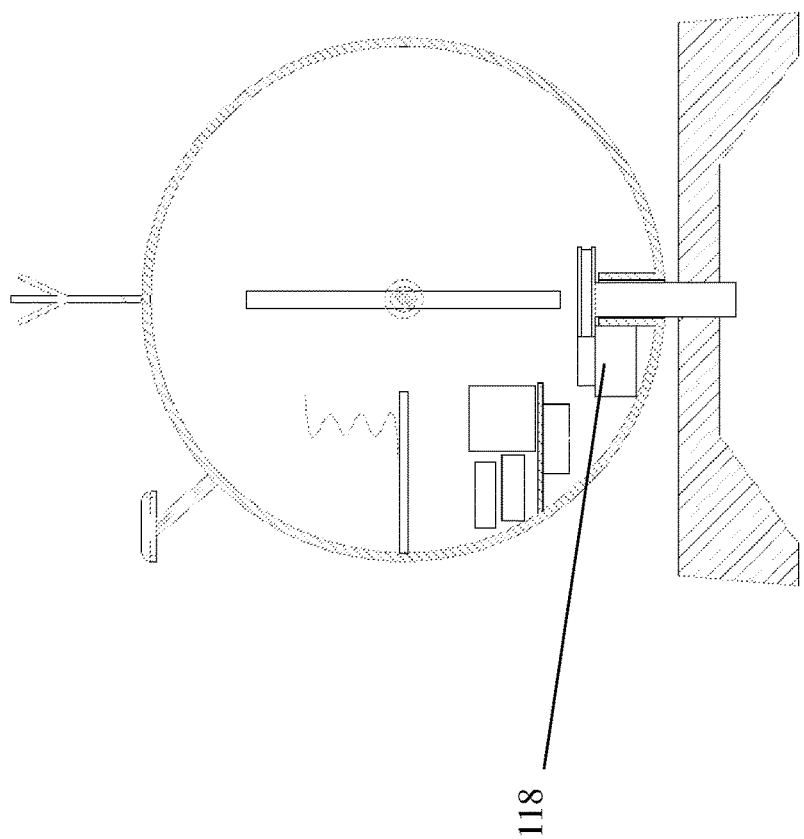
FIG. 7 is a diagram illustrating an antenna assembly according to some embodiments of the present invention.

It should be immediately appreciated that although a belt-driven type of motor system is disclosed, other types of motors are also contemplated. In some embodiments, the motor is a brushless motor. In other embodiments, the motor is a servo motor. FIG. 7 illustrates a direct-drive motor 118 attached to the frame 106 and powered by the power supply 130. The direct-drive motor 118 directly engages with the rod 104 to effectuate the rotating movement of the frame 106.

Moreover, the control panel 126 of the antenna assembly 100 is disposed on the upper side of the rack 116 for transmitting a video signal. The control board 128 is disposed on the control panel 126 for compensating a movement of the antenna assembly 100. The power supply 130 is disposed on the upper side of the rack 116 for supplying power to the motor 118, the control panel 126, and the control board 128. It is noted that the control panel 126, the control board 128, and the power supply 130 may be optional in some embodiments.

According to some embodiments, the first antenna 108 may be a panel antenna. For example, the panel antenna is a square shape panel antenna. The second antenna 110 may be a helical antenna. The third antenna 112 may be an omni-directional antenna. The fourth antenna 114 is arranged to receive a Global Positioning System (GPS) coordinates of the antenna assembly 100. The casing of the curvy frame 106 encloses the first antenna 108 and the second antenna 110, i.e. the first antenna 108 and the second antenna 110 are disposed on the inner surface 1062 of the curvy frame 106. The third antenna 112 and the fourth antenna 114 are disposed on the outer surface 1064 of the curvy frame 106.

Figure 2:
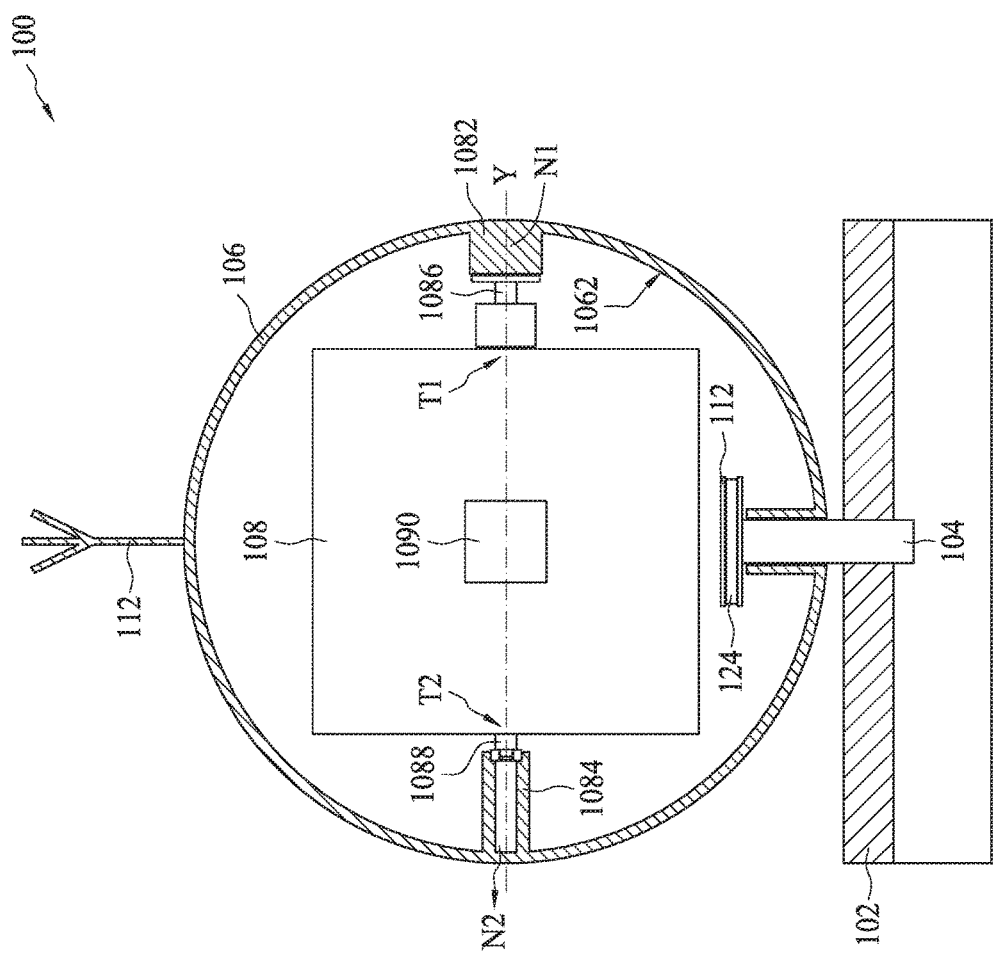
FIG. 2 is a diagram illustrating a front view of the antenna assembly of FIG. 1 according to some embodiments of the present invention.

FIG. 2 is a diagram illustrating a front view of the antenna assembly 100 according to some embodiments of the present invention. The first antenna 108 has a first end T1 coupled to a first position N1 of the inner surface 1062 of the curvy frame 106, and a second end T2 coupled to a second position N2 of the inner surface 1062 of the curvy frame 106. The first antenna 108 is arranged to be rotatable around a pivot Y extending from the first position N1 to the second position N2. According to some embodiments, the antenna assembly 100 further comprises a motor 1082, a sleeve 1084, a first pivot axle 1086, a second pivot axle 1088, and a measurement unit 1090. The motor 1082 is coupled to the first position N1 of the inner surface 1062. The sleeve 1084 is fixedly coupled to the second position N2 of the inner surface 1062. The first pivot axle 1086 is fixedly coupled to the first end T1 of the first antenna 108. The second pivot axle 1088 is fixedly coupled to the second end T2 of the first antenna 108. In addition, the first pivot axle 1086 is coupled to the motor 1082, the second pivot axle 1088 is wedged into the sleeve 1084. The motor 1082 is arranged to turn the first pivot axle 1086 for rotating the first antenna 108. Therefore, the pitch of the first antenna 108 is directly controlled by the motor 1082. It should be noted that, although the moving system is illustrated as belt driven system, there can be various other types such as servo motor, gear box, brushless motor, etc.

While most of the embodiments disclosed herein provides for a pivotable flat panel antenna 108 disposed within the outer frame 106, it should be noted that some embodiments specifically calls for a non-pivotable flat panel antenna 108 disposed within a rotatable outer frame 106. This particular embodiment is useful to be installed on a stationary station, such as a transmission point on the ground. The flat panel antenna 108 in such embodiment can be tilted. This would be an economical solution to eliminate the need for the additional equipment to motorize the flat panel antenna 108. One reason the flat panel antenna 108 on the stationary station does not need to adjust its pitch is because its initial tilt could be sufficient to communicate with UAVs in a distant. On the other hand, the flat panel antenna 108 in an antenna assembly 100 installed on a land vehicle would preferably be pivotable because during travel, the land vehicle may travel through terrain that tilts the vehicle, thereby requiring the flat panel antenna 108 to change its pitch to compensate.

The measurement unit 1090 is formed on the middle portion of the first antenna 108 for measuring an angle between the first antenna 108 relative to a remote object. The measurement unit 1090 may be formed on other portions, such as a side portion, on the first antenna 108. According to some embodiments, the measurement unit 1090 is an inertial measurement unit (IMU). The IMU allows the control board 128 to compensate sudden movements of the antenna assembly 100, such as the sudden movements of the vehicle that the antenna assembly 100 installed on, by instantly adjusting the yaw and pitch via controlling the side motor 1082 and the bottom motor 118. The IMU allows instant measurement of the angle of the first antenna 108 relative to the UAV. For brevity, these components function similar to a 2-axis gimbal.

According to some embodiments, the power supply 130 may further supply power to the motor 1082 and the measurement unit 1090. However, this is not a limitation of the present embodiments.

Referring to FIG. 1 again, the second antenna 110 having a first end T3 coupled to a third position N3 of the inner surface 1062 of the curvy frame 106, and a second end T4 exposed to an inner space surrounded by the curvy frame 106. According to some embodiments, the antenna assembly 100 further a platform 1102 for supporting the second antenna 110. The platform 1102 has first side fixedly coupled to the third position N3, and a second side extended to the inner space of the curvy frame 106. The first end T3 of the second antenna 110 is coupled to the platform 1102. For example, the first end T3 of the second antenna 110 is fixedly disposed on the upper surface of the platform 1102.

The second antenna 110 is arranged to transmit video data and other data to and from another communication point located directly above or below the antenna assembly 100. For example, when the second antenna 110 points upward (i.e. the arrow above the second antenna 110), the second antenna 110 can communicate with a UAV hovering directly above the antenna assembly 100. This is especially desirous when the ground obstacles, e.g., tall buildings, are in the way of transmitting data from a ground communication point, e.g., land vehicle driving through tall buildings.

The third antenna 112 has a first end T5 fixedly coupled to a fourth position N4 of an outer surface 1064 of the curvy frame 106, and a second end T6 exposed to an outer space outside the curvy frame 106. According to some embodiments, the third antenna 112 is an omni-directional antenna. Therefore, the third antenna 112 may have a plurality of second ends T6 exposed to the outer space. Moreover, the fourth position N4 is located opposite to the first rod 104. The fourth position N4 may be the top of the casing, and the first rod 104 may be located at the bottom of the casing.

The fourth antenna 114 has a first end T7 fixedly coupled to a fifth position N5 of the outer surface 1064 of the curvy frame 106, and a second end T8 exposed to the outer space outside the curvy frame 106. According to some embodiments, the fifth position N5 of the outer surface 1064 is different from the fourth position N4 of the outer surface 1064. For example, the fifth position N5 is located on the upper portion of the casing. The fourth antenna 114 is arranged to receive a Global Positioning System (GPS) coordinates of the antenna assembly 100, and the third antenna 112 is arranged to transmit the GPS coordinates to the remote object.

According to some embodiments, the fourth antenna 114 may be replaced with a receiver for obtaining the GPS coordinates of the antenna assembly from satellite. The receiver may be disposed on the upper portion of the casing.

Figure 3:
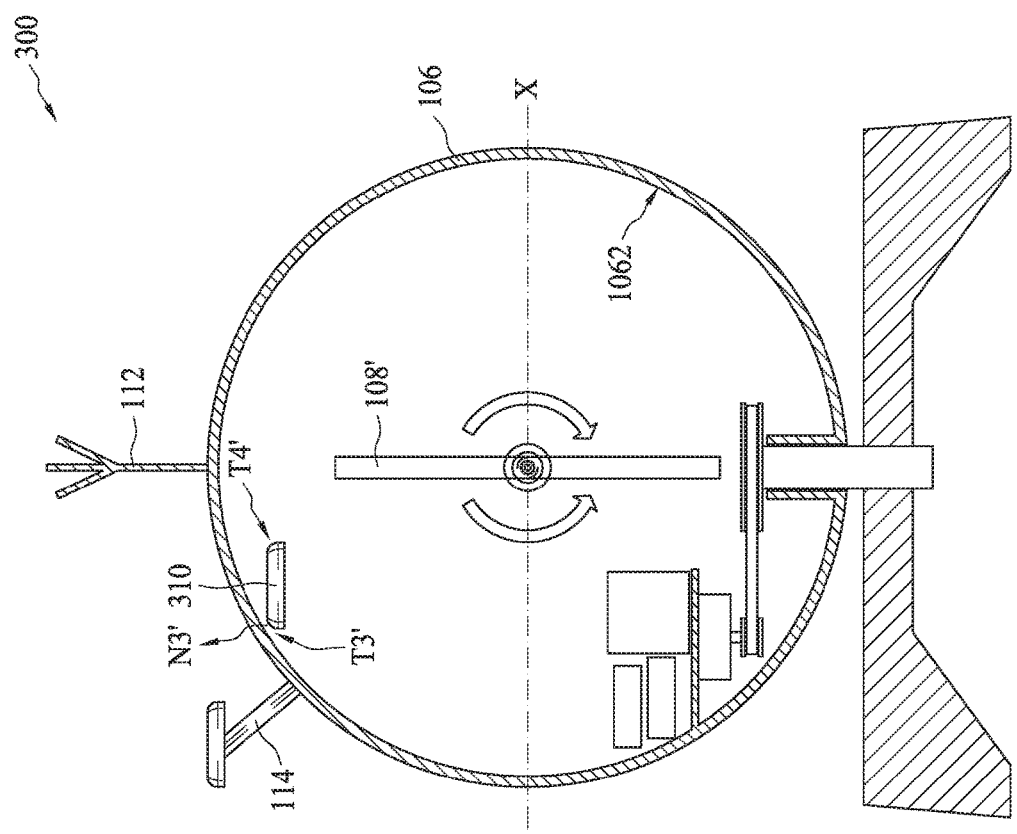
FIG. 3 is a diagram illustrating an antenna assembly according to some embodiments of the present invention.

According to the antenna assembly 100, the first antenna 108 is coupled within the curvy frame 106 about the pivot Y. This arrangement allows the first antenna 108 to tilt to a wide range of degrees. According to some embodiments, the range of movement may be plus and minus 20 degrees. In other embodiment, such as the embodiment as shown in FIG. 3, the range movement can be much greater, such as plus and minus 90 degrees. Yet in another embodiment, the first antenna 108 is capable to tilt an angle between −20~−90 degrees to +20~+90 degrees around the pivot Y. This movement effectively adjusts the pitch of the first antenna 108. This allows the first antenna 108 to change its pitch to optimize data transmission by directly aiming the first antenna 108 towards the other communication point, e.g., a UAV. Moreover, the first antenna 108 is arranged to rotate around the pivot Y, the second antenna 110 is arranged to directly point upward, the third antenna 112 is disposed on the top of the curvy frame 106, and the fourth is disposed on the upper portion of the curvy frame 106 and does not obstruct the direction of the second antenna 110, therefore the placement of the first antenna 108, the second antenna 110, the third antenna 112, and the fourth antenna 114 have the minimum interference with each other.

According to some embodiments, the second antenna 110 may be replaced with an upward-detecting panel antenna as shown in FIG. 3. FIG. 3 is a diagram illustrating an antenna assembly 300 according to some embodiments of the present invention. In this embodiment, the transmission of video data is carried out by the upward-detecting panel antenna 310. For brevity, the other element numerals of the antenna assembly 300 are similar to those of the antenna assembly 100. The upward-detecting panel antenna 310 having a first side T3' coupled to a position N3' of the inner surface 1062 of the curvy frame 106, and a second side T4' extended to an inner space surrounded by the curvy frame 106. The upward-detecting panel antenna 310 performs the similar functions to the second antenna 110 of the antenna assembly 100. However, the size of the upward-detecting panel antenna 310 is smaller than the size of the second antenna 110, and the upward-detecting panel antenna 310 is disposed almost on the top of the curvy frame 106. Therefore, the first antenna 108' of the antenna assembly 300 may be designed to have larger size than the first antenna 108 of the antenna assembly 100. Moreover, the first antenna 108' may have a larger pitch than the first antenna 108 of the antenna assembly 100 because the upward-detecting panel antenna 310 is kept away from the rotation radius of the first antenna 108'. For example, the first antenna 108' may adjust its pitch to or beyond a horizontal axis X as shown in FIG. 3.

Figure 4:
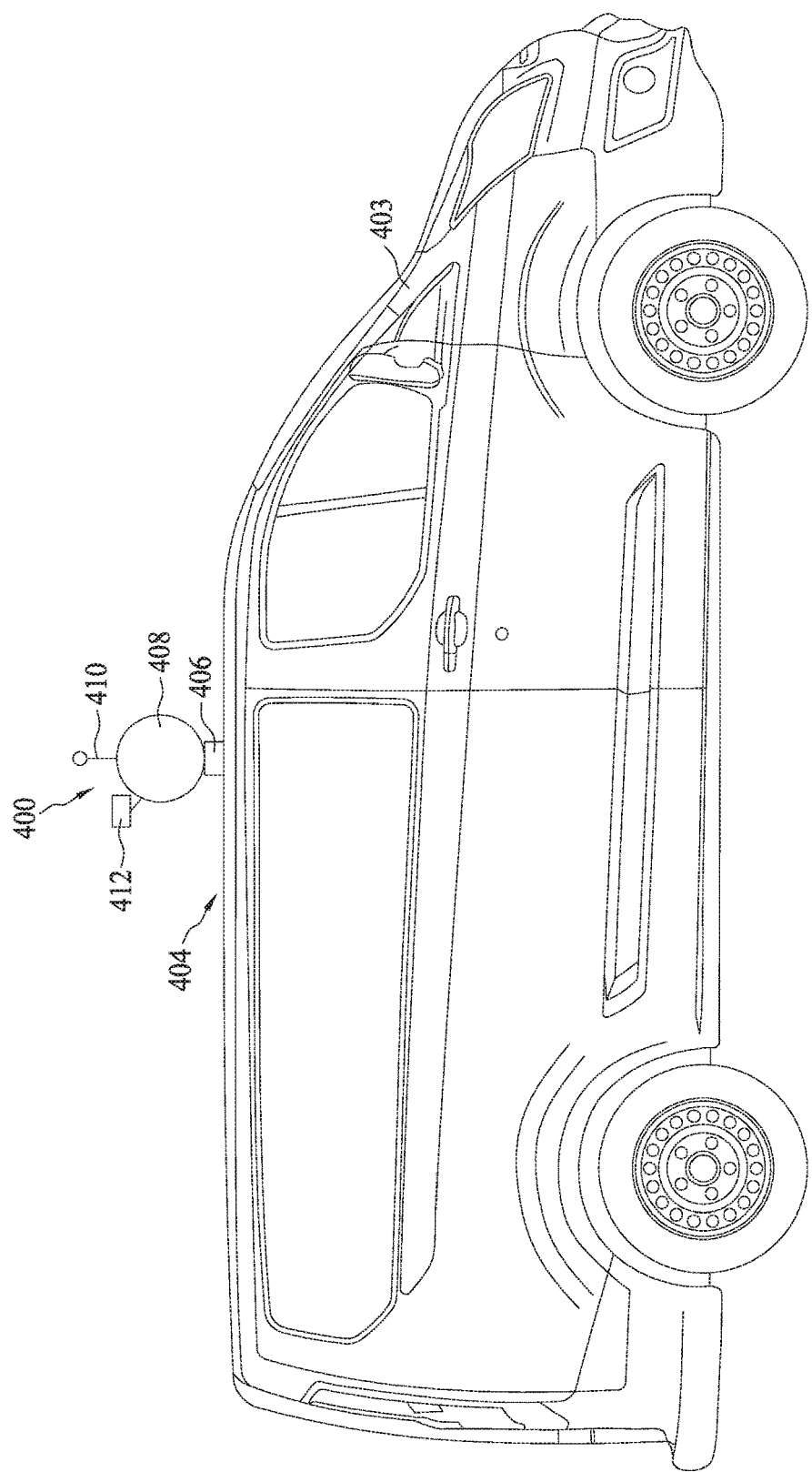
FIG. 4 is a diagram illustrating a vehicle applying an antenna assembly according to some embodiments of the present invention.

FIG. 4 is a diagram illustrating a vehicle 402 applying an antenna assembly 400 according to some embodiments of the present invention. The vehicle 402 is a land vehicle. The antenna assembly 400 may be the antenna assembly 100 or the antenna assembly 300. The antenna assembly 400 is arranged to point upward for transmitting video data to a communication point above the vehicle, e.g., a UAV. According to the embodiment of FIG. 4, the antenna assembly 400 is installed on the top 404 of the vehicle 402 for communicating with a UAV flying above the vehicle 402. To make the antenna assembly 400 pointing upward, the base 406 of the antenna assembly 400 is installed on the top 404 of the vehicle 402. The other elements of the antenna assembly 400, such as the spherical casing 408, the omni-directional antenna 410, and the GPS receiver 412, are disposed above the base 406. It is noted that, similar to the antenna assembly 100 or the antenna assembly 300, the antenna assembly 400 further comprises a panel antenna, a helical antenna, a rack, a motor, a rod, a flywheel, a belt, a control panel, a control board, and/or a power supply disposed on inside the spherical casing 408. As the configuration of the antenna assembly 400 is similar to the antenna assembly 100 or the antenna assembly 300, and the detailed description is omitted here for brevity.

It is noted that the antenna assembly 100 or the antenna assembly 300 may be arranged to point downward for transmitting video data to a communication point below the antenna assembly, e.g. a boat or a land vehicle. FIG. 5A is a diagram illustrating an antenna assembly 500 according to some embodiments of the present invention. FIG. 5B is a diagram illustrating a front view of the antenna assembly 500 according to some embodiments of the present invention. The antenna assembly 500 comprises a base 502, a first rod 504, a spherical casing 506, a panel antenna 508, a helical antenna 510, an omni-directional antenna 512, a platform 5102, a rack 516, a motor 518, a second rod 520, a flywheel 522, a belt 524, a control panel 526, a control board 528, and a power supply 530. According to some embodiments, the base 502, the first rod 504, the spherical casing 506, the panel antenna 508, the helical antenna 510, the omni-directional antenna 512, the platform 5102, the rack 516, the motor 518, the second rod 520, the flywheel 522, the belt 524, the control panel 526, the control board 528, and the power supply 530 are similar to the base 102, the first rod 104, the curvy frame 106, the first antenna 108, the second antenna 110, the third antenna 112, the platform 1102, the rack 116, the motor 118, the second rod 120, the flywheel 122, the belt 124, the control panel 126, the control board 128, and the power supply 130 respectively, and thus the detailed description is omitted here for brevity. For example, the antenna assembly 500 is coupled to the bottom of a UAV, and the helical antenna 510 points downward to transmit video data to a communication point directly below the UAV, e.g., a boat or a land vehicle below the UAV. Similar to the antenna assembly 300, the helical antenna 510 and the platform 5102 may be replaced with a downward-detecting panel antenna. In comparison to the antenna assembly 100, the GPS receiver can or cannot be installed on the outer surface of the spherical casing 506 of the antenna assembly 500. However, this is not a limitation of the present embodiment. The GPS receiver may be installed on the outer surface of the spherical casing 506 that is closer to the base 502 of the antenna assembly 500 for receiving GPS coordinates from satellite.

Figure 6:
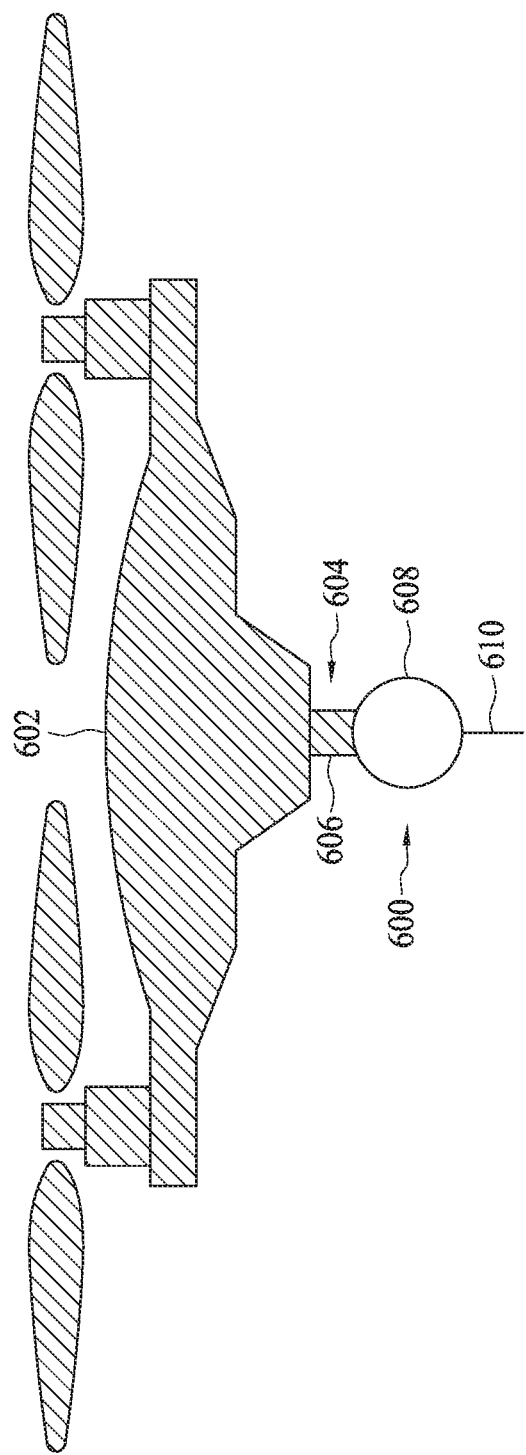
FIG. 6 is a diagram illustrating a UAV applying an antenna assembly according to some embodiments of the present invention.

FIG. 6 is a diagram illustrating a UAV 602 applying an antenna assembly 600 according to some embodiments of the present invention. The antenna assembly 600 may be the antenna assembly 500. The antenna assembly 600 is arranged to point downward for transmitting video data to a communication point below the UAV 602, e.g., a land vehicle. According to the embodiment of FIG. 6, the antenna assembly 600 is installed on the bottom 604 of the UAV 602 for communicating with a vehicle moving below the UAV 602. To make the antenna assembly 600 pointing downward, the base 606 of the antenna assembly 600 is installed on the bottom 604 of the UAV 602. The other elements of the antenna assembly 600, such as the spherical casing 608 and the omni-directional antenna 610, are disposed below the base 606. It is noted that, similar to the antenna assembly 500, the antenna assembly 600 further comprises a panel antenna, a helical antenna, a rack, a motor, a rod, a flywheel, a belt, a control panel, a control board, and/or a power supply disposed on inside the spherical casing 608. As the configuration of the antenna assembly 600 is similar to the antenna assembly 500, and the detailed description is omitted here for brevity.

According to the above embodiments, a plurality of antennae are installed on a spherical casing, and the plurality of antennae have the minimum interference with each other. Therefore, the capability of data transmission of the present antenna assembly is improved.

When a drone communicates with another drone via multiple transmission channels (e.g. one channel transmits data while another channel transmits video), and when each transmission channel requires a separate antenna, then the drone is required to be equipped with multiple antennae on its body. The present embodiments have minimized interference between multiple antennae on a single drone. In addition, the disclosed spherical outer casing minimizes damage to each antenna contained therein, whereas prior art drones typically has antennae exposed to the elements and is prone to damage due to a crash, getting hit by a bird, and inclement weather.

The disclosed spherical antenna assembly contains multiple antennae within a single housing. All antennae may be enclosed within the same housing. In another embodiment, one or more antennae may be attached to the outside of the housing.

In another contemplated embodiment, the spherical antenna assembly can be interchangeably installed on a car, on a tripod, under a drone, on a boat, etc.

In yet another contemplated embodiment, the spherical antenna assembly can be quickly and detachably attached to a car, on a tripod, under a drone, on a boat, etc. For example, when a spherical antenna assembly on a drone has malfunctioned in the field, the user may quickly detach it and reinstall another spherical antenna assembly onto the drone with ease, allowing a quick replacement so the drone may continue its duty with minimum down time.

The contemplated shape of the outer casing minimizes disturbance from the wind.

According to the embodiments, all movements can be controlled to compensate movement of the drone so that the panel antenna within the spherical outer casing can stay fixated on a target.

According to the embodiments, when the present antenna assembly is installed on the ground, the antenna assembly may have only 1-axis of movement (i.e., pitch). This may minimize the cost of having to rotate the assembly in a yaw direction. For example, when the antenna assembly is installed on a building pointing at only one direction, and the drone it is communicating with is only fly within a certain area in the same direction, then there is no need for the antenna assembly to change its yaw. However, the antenna assembly may have 2-axis of movement (i.e., pitch and yaw) when the antenna assembly is installed on the ground.

According to the embodiments, when the antenna assembly is installed on a mobile object (e.g., a car, a boat) traveling on the ground or over water, the antenna assembly may have 2-axis of movement (i.e., pitch and yaw). For example, as the car drives around in all directions, the antenna assembly would need constantly to change its yaw so that the panel antenna stays fixated on the same target.

According to the embodiments, the antenna assembly is installed and inverted under a drone/airplane/helicopter/any other aerial vehicle.

The antenna assembly may be hung from tall buildings at street intersections in a downtown, where the large number of tall buildings typically affect any kind of wireless transmission. By using the antenna assembly, the wireless transmission within the city is enhanced. In another way, the antenna assembly enhances the communication of a drone if the drone is to operate among those buildings.

According to some embodiments, an antenna assembly is provided. The antenna assembly comprises a base, a first rod, a curvy frame, a first antenna, and a second antenna. The first rod is coupled to the base. The curvy frame is coupled to the first rod, and the curvy frame is rotatable around the first rod. The first antenna has a first end coupled to a first position of an inner surface of the curvy frame, and a second end coupled to a second position of the inner surface of the curvy frame. The first antenna is rotatable around a pivot extending from the first position to the second position. The second antenna has a first end coupled to a third position of the inner surface of the curvy frame, and a second end exposed to an inner space surrounded by the curvy frame.

According to some embodiments, an antenna assembly is provided. The antenna assembly comprises a first rod, a casing, a first antenna, and a second antenna. The casing is coupled to the first rod. The first antenna is disposed on an inner surface of the casing. The second antenna is disposed on an outer surface of the casing. The casing is arranged to be rotatable around the first rod.

According to some embodiments, the first panel antenna enclosed within the casing can only have one range of movement, by pivoting about a horizontal axis that is perpendicular to vertical axis to which the casing rotates about. In this embodiment, by limiting the range of movement for the first panel antenna to only one single range of movement within a limited range of degrees, it allows for additional dead space within the casing to house other useful items such as additional antennae, motor, and power source. Although the first panel antenna has only limited range of movement, it is supplemented with a rotating casing so that the first panel antenna can have a complete or near complete coverage.

Thus, specific embodiments and applications of a spherical antenna been disclosed. It should be apparent, however, to those skilled in the art that many more modifications besides those already described are possible without departing from the disclosed concepts herein. Insubstantial changes from the disclosure as viewed by a person with ordinary skill in the art, now known or later devised, are expressly contemplated as being equivalent within the scope of the disclosure. Therefore, obvious substitutions now or later known to one with ordinary skill in the art are defined to be within the scope of the disclosure. The disclosed inventive subject matter is thus to be understood to include what is specifically illustrated and described above, what is conceptually equivalent, what can be obviously substituted and also what essentially incorporates the essential idea of the embodiments.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An antenna assembly, comprising:
   a rod;
   an outer frame rotatably coupled to the rod, the outer frame being rotatable relative to said rod, and rotatable about a vertical axis of the outer frame;
   a flat panel antenna capable of moving in a pivoting motion about a horizontal axis, said flat panel antenna having a first end coupled to a first position of an inner surface of the outer frame, the first panel antenna being pivotable around a pivot extending from the first position to move in said pivoting motion;
   a helical antenna disposed within the outer frame and is directed in a direction parallel to the vertical axis;
   an omni-directional antenna disposed on an outside of said outer frame on an opposite end of the outer frame to the rod, and the omni-directional antenna is on the same vertical axis as said rod; and wherein the vertical axis is perpendicular to said horizontal axis.

2. The antenna assembly of claim 1, wherein the flat panel antenna is arranged to tilt an angle between −90 degrees to +90 degrees around the pivot.

3. The antenna assembly of claim 1, further comprising:
a motor coupled to the flat panel antenna;
a sleeve fixedly coupled to a second position of the inner surface;
a first pivot axle fixedly coupled to the first end of the flat panel antenna; and
a second pivot axle fixedly coupled to a second end of the flat panel antenna;
wherein the first pivot axle is further coupled to the motor, the second pivot axle is further wedged into the sleeve, and the motor is arranged to turn the first pivot axle to rotate the flat panel antenna.

4. The antenna assembly of claim 1, further comprising:
a measurement unit disposed on a middle portion of the flat panel antenna to measure an angle of the flat panel antenna.

5. The antenna assembly of claim 4 further comprising a second panel antenna disposed within the outer frame, and the second panel antenna is directed in said direction parallel to said vertical axis.

6. The antenna assembly of claim 1 further comprising a motor to rotate the outer frame around the first rod.

7. The antenna assembly of claim 1 further comprising:
a control panel disposed within the outer frame;
a power supply disposed within the outer frame to supply power to the motor.

8. The antenna assembly of claim 1, further comprising a vehicle attached to the antenna assembly, wherein the vehicle is one selected from an aerial vehicle, a land vehicle, and a watercraft.

9. The antenna assembly of claim 1, wherein the helical antenna is disposed behind the flat panel antenna.

10. The antenna assembly of claim 9 further comprising a GPS antenna disposed on said outside of the outer frame, wherein the GPS antenna is arranged to receive a Global Positioning System (GPS) signal.

11. An unmanned aerial vehicle comprising:
a body having a bottom side;
a rotatable casing coupled to said bottom side of the body capable of rotating about a vertical axis relative to said body, wherein the vertical axis is perpendicular to a horizontal axis of the unmanned aerial vehicle;
a flat panel antenna pivotably coupled to an inner surface of the casing, wherein the flat panel antenna is capable of pivoting to change a pitch relative to the casing;
an omni-directional antenna disposed on the casing, and is on the same vertical axis as said rod;
a helical antenna disposed within the casing and is directed in a downward direction parallel to the vertical axis; and
a directional antenna disposed within the casing directed towards a downward direction and is disposed behind the flat panel antenna.

12. The unmanned aerial vehicle of claim 11 further comprising a receiver disposed on the outer surface of the casing to receive a Global Positioning System (GPS) signal.

13. The unmanned aerial vehicle of claim 11 further comprising a motor and a power source disposed within the casing.

14. The unmanned aerial vehicle of claim 11 further comprising a measurement unit disposed on a middle portion of the flat panel antenna to measure an angle of the flat panel antenna.

15. The unmanned aerial vehicle of claim 11 further comprising a second panel antenna disposed within the casing, and the second panel antenna is directed in said downward direction parallel to said vertical axis.

16. The unmanned aerial vehicle of claim 11, wherein the rotatable casing is driven by said motor, and said motor is one of a belt-driven type, a brushless motor, and a servo motor.

* * * * *